June 2, 1953 G. C. DOELTER 2,640,627
VAPOR RECOVERY SYSTEM FOR FUEL TANKS
Filed Jan. 14, 1950
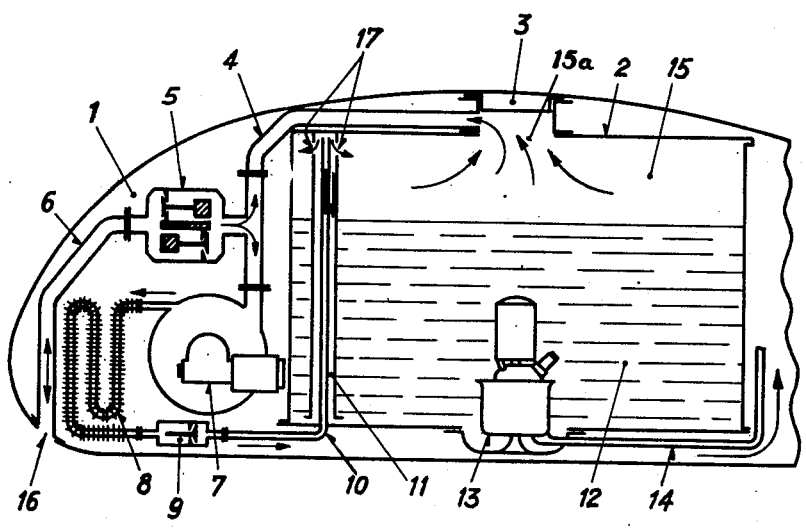
INVENTOR:
Gandolph C. Doelter
BY
ATTORNEYS Patented June 2, 1953

2,640,627

UNITED STATES PATENT OFFICE 2,640,627

VAPOR RECOVERY SYSTEM FOR FUEL TANKS

Gandolph C. Doelter, Paris, France, assignor to Vadolt Trust, Vaduz, Principality of Liechtenstein, a company of the Principality of Liechtenstein Application January 14, 1950, Serial No. 138,692 In Switzerland January 15, 1949

1 Claim. (Cl. 220—85)

The present invention relates to a process and a device for condensing fuel vapours, especially those of aviation petrol, formed during flight at great altitudes.

Boiling and excessive vapour formation in highly volatile fuels, especially aviation fuels, occur when aircraft reach considerable altitudes of flight. The cause of this phenomenon is to be found in the lowering of the boiling point of the fuel in relation to that obtaining at ground level (flying altitude zero), this lowering of the boiling point being itself due to the progressive decrease in atmospheric pressure that accompanies an increase of altitude. The attainment of this lower boiling point is, however, also substantially influenced by the temperature of the fuel, which latter cannot, with the high climbing speeds of modern aircraft, cool at the rate that would be necessary to compensate for the rapid fall in atmospheric pressure and thereby keep the boiling point to some extent within the limits obtaining at ground level.

A high climbing speed of the aircraft, and a high ground temperature of the fuel, both unfavourably influence the shift of boiling point and consequently the formation of vapour, quite apart from the quality of the fuel. By quality, in this connection, should be understood the proportion of extremely volatile components of particularly low boiling point. An aviation fuel, for instance, that commences to boil at approximately 62° C. at a ground-level temperature of 27° C. and a flying altitude of zero will boil at a flying altitude of 8200 metres if it has retained its ground-level temperature of 27° C. At an altitude of 12,000 metres the same fuel would need to be cooled to 8° C. to be just below boiling point, and at 15,000 metres it would have to be cooled to −6° C.

The climbing speeds of modern jet-propelled fighter aircraft (approximately 3000 metres per minute), for instance, permit, in the short times involved, of no appreciable cooling of the supply of fuel carried. The consequence is excessive boiling of the fuel in the tank, which leads to substantial losses of fuel, quite apart from complications arising in other directions, and the vapours formed are forced through the venting pipe of the tank into the outer atmosphere and lost. The most obvious solution to this problem, namely, to prevent escape of the vapours by hermetically sealing the tank, would call for tanks of high resistance to internal pressure, and would, for reasons of weight and safety, not be feasible, especially in view of the danger of explosion that would arise in the event of the aircraft coming under fire.

This formation of vapour has itself a powerful cooling action on the fuel. The high heat requirements of the evaporation process result— assuming that adiabatic cooling takes place— in so much heat being extracted from the fuel that its temperature constantly falls. Moreover, the chemical composition of the boiling fuel changes, as the more volatile components evaporate first.

Even allowing for the compensatory action of the cooling process, the losses caused by boiling amount, by the time a flying altitude of 1500 metres is attained, and assuming a ground-level temperature of 27° C. of the fuel, to approximately 12% of the liquid volume. At higher ground-level temperatures in summer or under tropical conditions the losses by evaporation may reach as much as 18%.

In order to overcome, in actual flying operations, the difficulties arising from the phenomena described, the following fundamental measures have hitherto been available:

(a) The use of a fuel of particularly low vapour pressure, i. e., high boiling point. This solution to the problem is, however, universally impracticable with the existing production plant and the existing designs of aircraft engines. Another possibility is to use low-volatile crude petrol or diesel oil for driving gas turbines, but this involves complications both of an operational nature and in the matter of supplies.

(b) Cooling the fuel before taking off or during flight. Pre-cooling of the fuel before taking off is technically feasible, but it complicates the refuelling arrangements and interferes with the take-off of the aircraft, which in the case for instance of fighter aircraft, cannot often be accurately predetermined as to time. A travelling ground refrigerator plant for this purpose would have to be driven by a motor of approximately 60 hp. to cool the entire fuel load of a twin-engined jet-propelled bomber from 30° C. to 0° C. in half an hour.

Cooling during flight, especially cooling of the entire supply of fuel, is not possible in practice— except perhaps in the case of non-self-sealing metal wing tanks and low climbing speeds—as the installation of the necessary coolers and circulation pumps would be associated with enormous drawbacks from the point of view of weight and of streamlining. A twin-engined jet-propelled bomber, for instance, would require, under summer conditions, to cool its fuel supply, a cooler having a front surface area of at least 0.55 square metre, and the entire supply of fuel would have to be pumped through once per minute.

(c) The use of high-pressure tanks is, as already indicated, not universally practicable for reasons of weight and safety.

The object of the process in accordance with the present invention is not to prevent the boiling of the fuel, but deliberately to encompass such boiling and consequently to keep it under control at all times. The inventive process consists in creating in a tank, by exhausting the vapours from the tank by means of a pump, a pressure inferior to that of the outside atmosphere, thus causing the fuel to boil earlier than under normal conditions in compressing the vapours so withdrawn and returning them to the tank in a liquid state.

The cooler and pump are therefore dimensioned to cope with small quantities of vapour only; the actual cooling of the fuel takes place automatically as a result of the extraction of heat during boiling. By controlling the time taken to reach boiling point, i. e., by regulating the intake suction of the condenser pump and thereby the reduction of the pressure in the tank, the boiling of the fuel can be intentionally produced at altitudes lower than those at which it would otherwise take place. The substantial quantities of heat used for the evaporating process promote rapid and early cooling of the fuel, which has a compensatory effect on the boiling point when greater altitudes of flight are attained, i. e., when a further fall of pressure in the tank occurs.

Evaporation will consequently be kept almost constant at all times, and even at maximum altitudes of flight and maximum climbing speeds will not exceed the appropriately calculated capacity of the condenser pump. The negative pressure produced in the tank by the suctional evacuation of the vapours is maintained by suitable means within the range of 20 to 30 mm. mercury gauge and consequently does not influence the strength requirements of the tank. The supply of fresh air to the tank takes place automatically only in proportion to the volume of fuel pumped to the engine.

Evaporation losses are in this way entirely eliminated. A preliminary condition for this condensation of vapour, and self-cooling, is the use of existing delivery pumps capable of handling even boiling fuel.

The device used to perform the process comprises, in accordance with the invention, a combined suction and force pump that is connected on the one hand by a suction pipe to the uppermost part of the interior of the tank and suctionally exhausts and compresses the vapour from the tank, and delivers it via a cooling device in which it is condensed, to the liquid fuel. The delivery pipe extends to the top of the tank and is surrounded by a pipe open at the bottom and provided at its upper extremity with gas outlet apertures in such a way that the cooled fuel is added to and mixed with the contents of the tank from below and entrained gases escape through said apertures into the upper portion of the tank, the suction and delivery pipes both being provided with valves. The figure of the drawing shows a diagrammatic side elevation view of the invention.

The annexed drawing illustrates a typical embodiment of the inventive device comprising the following basic functional units: the condenser pump 7, which suctionally removes via the vent pipe 4, and compresses, the fuel vapours 15a formed in the tank; the cooler 8, which gives off the heat released by the compression and condensation of the fuel vapours in the pump; the barometric regulating valve 9, which maintains the necessary condensing pressure in pump and cooler; and the barometric regulating valve 5, the purpose of which is to keep the pressure in the tank at all times about 20 to 30 mm. mercury gauge below the outer atmospheric pressure as soon as the pump starts up.

The diagram shown in the drawing relates to a device of a type that can be used for fuel tanks preferably accommodated in the wings of an aircraft. The wing 1, shown in cross-section, contains the fuel tank 2 with a filler hole 3. The feed pump 13 forces the fuel 12 through the pipe 14 to the engine. The vapours 15a formed in the tank above the surface of the fuel and produced by the boiling of the highly volatile fuel during flight at high altitudes are suctionally withdrawn through the pipe 4 by the pump 7. The latter compresses the vapours and causes them to condense. The power required to effect this compression is supplied by the pump motor and is converted into the heat liberated by the condensed vapours, this heat being given off by the cooler 8. The cooled and condensed, liquid fuel returns to the tank via the delivery valve 9 through the riser pipe 10. The riser pipe 10 extends almost to the top of the tank and is surrounded by the separator tube 11, which is open at its lower extremity. The purpose of this pipe 11 is to mix the liquid emerging from the pipe 10 with the remaining liquid contents of the tank under conditions of minimum vapour and bubble formation, this mixing being effected via the opening at the bottom of said pipe 11. A plurality of openings 17 provided at the upper end of said pipe 11, but below the outlet aperture of the riser pipe 10, serve the purpose of conducting to a point above the surface of the liquid in the tank the vapour or air bubbles inevitably entrained or formed, thus preventing their bubbling up through the liquid.

The regulating valve 5 comprising two parts, has a twofold function. When the pump 7 is operating, the valve 5 is required to ensure that the negative pressure created in the space 15 by the suctional withdrawal of the vapours, does not fall below the external atmospheric pressure by more than a certain amount, usually 20–30 mm. mercury gauge. If the suction of the pump 7 exceeds what is necessary to cope with the quantity of vapour formed, i. e., if the negative pressure passes beyond the range specified, the inlet valve opens so as to adjust the negative pressure in relation to the external atmosphere pressure until the negative pressure set is restored. If, on the other hand, the formation of vapour for any reason assumes proportions exceeding the capacity of the pump, or if, for instance, the pump is not functioning, the vapours formed are, as soon as the negative pressure has reached a value of 20 to 30 mm. mercury gauge, allowed by the outlet valve to escape into the outer atmosphere via the pipe 6 and the aperture 16, this being accomplished by the regulating valve 5.

This arrangement ensures that negative or positive pressures of more than 20 to 30 mm. mercury gauge below or above the prevailing external atmospheric pressure can never arise in the tank. When the pump is functioning, i. e., when the vapours are being suctionally withdrawn, there is always a slight negative pressure in the tank, this being of particular advantage when the tank is slightly damaged.

The further valves and safety devices necessary are omitted from the drawing to avoid confusion.

I claim:

A device for condensing fuel vapours, the device comprising a tank, a combined suction and force pump for the vapours in the tank, a suction pipe connecting the pump to the uppermost part of the interior of the tank; the device further comprising a delivery pipe and a cooling device and a separator pipe, the pump being connected to the delivery pipe through the cooling device, the delivery pipe returning the fuel from the cooling device in which the vapour is condensed to the tank, the delivery pipe entering at the bottom of the tank and extending upwardly therein substantially to the top thereof, the delivery pipe being substantially surrounded in the tank by the separator pipe, the separator pipe being open at the lower end thereof and having at least one aperture formed therein adjacent the upper end extremity, and a valve connected to the suction pipe.

GANDOLPH C. DOELTER.

References Cited in the file of this patent

UNITED STATES PATENTS

| Number    | Name          | Date          |
|-----------|---------------|---------------|
| 1,439,451 | Seibert et al. | Dec. 19, 1922 |
| 1,808,618 | Trezise       | June 2, 1931  |
| 2,059,942 | Gibson        | Nov. 3, 1936  |
| 2,126,367 | Clawson et al. | Aug. 9, 1938  |
| 2,379,215 | Brinkmann     | June 26, 1945 |